April 8, 1930. D. B. GARDNER 1,753,697
REFLECTING AND SCANNING APPARATUS
Filed Sept. 17, 1928
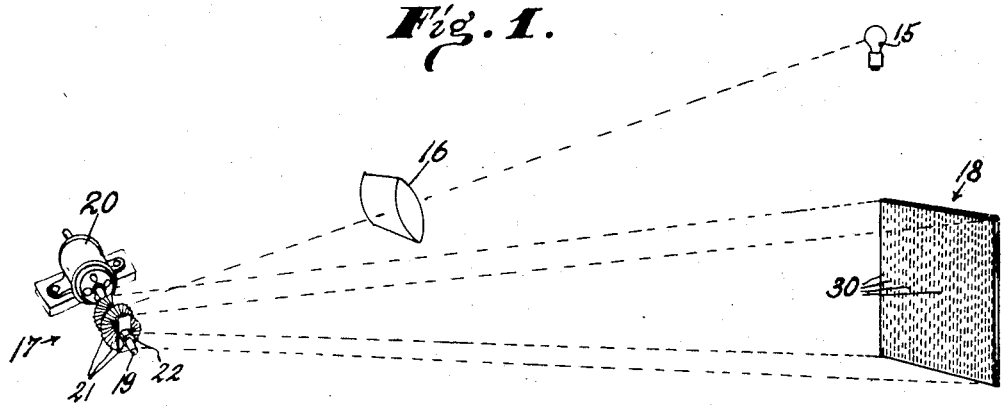
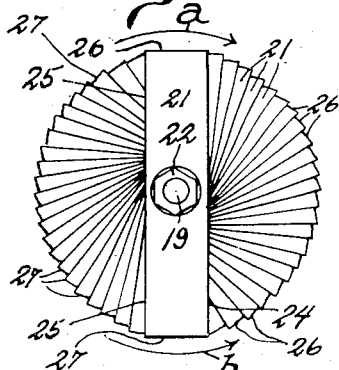
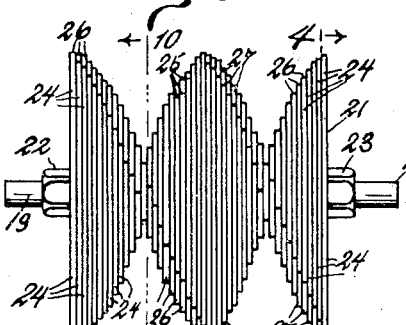
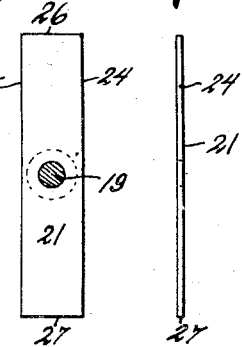
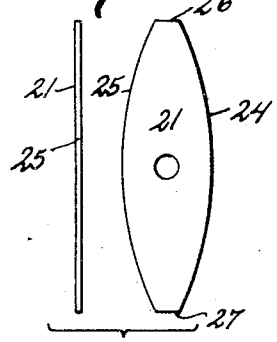
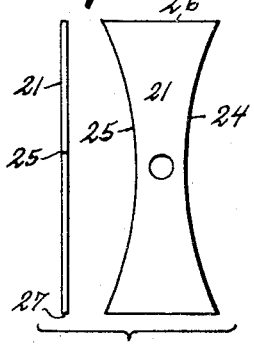
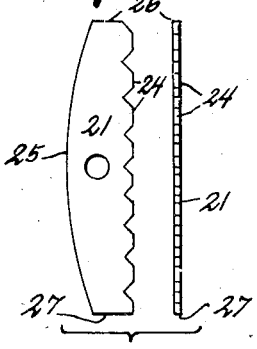
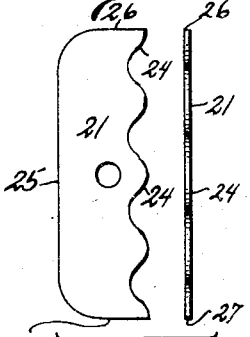
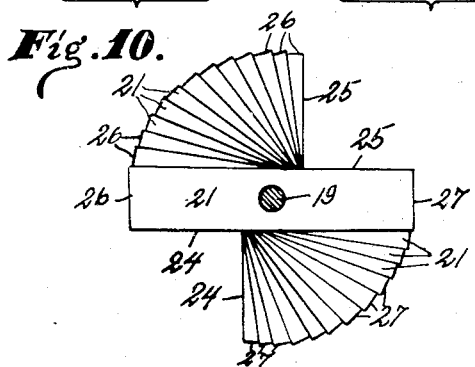
Inventor.
Delamere B. Gardner.
by
Lockwood & Lockwood,
His Attorneys.

Patented Apr. 8, 1930

1,753,697

UNITED STATES PATENT OFFICE

DELAMERE B. GARDNER, OF LOS ANGELES, CALIFORNIA

REFLECTING AND SCANNING APPARATUS

Application filed September 17, 1928. Serial No. 306,338.

This invention relates to a rotary apparatus for use in television, telephoto, radio-photo and the like, and the principal object is to greatly improve and simplify the means for reflecting images and scanning scenes that are to be visualized, reproduced or transmitted; and to that end I provide a rotating helical mirror that is formed of a plurality of rectangular sheet metal plates secured together on a shaft with the plates arranged in angular stepped relation to one another so that they form a helix of one turn on the shaft; and each plate has a mirror edge arranged close to and tangentially to the shaft with the plates elongated so that the mirror edges are of great length and thereby reflecting in an arc of almost half the diameter of the rotary apparatus, and the other edge and also the ends of each plate are treated to make them non-reflectors of light so that only the mirror edges of the plates reflect the light when the rotary apparatus is in operation.

Another object of the invention is to provide a rotary apparatus for reflecting light and scanning in television which, when its drive shaft is mounted in a horizontal position, will reflect light in elongated vertical lines over a field with the light traveling line by line from end to end of the field. In other words the reflecting edges of the plates are of considerable length so that they reflect in a large arc or in lines of great length with the reflected ray of light from a lamp moving successively over the reflecting edges point by point and from end to end of each edge and in a direction governed by the direction of the rotary apparatus.

Another object of the invention is to provide a rotary apparatus that can be rotated in either direction to scan a field or object; and which when rotated traces rays of light in a predetermined manner so as to cover the entire field or object in two directions on each rotation and also so that the scanning can be used in the art of television and other similar arts as previously stated.

A feature of invention is shown in the construction and arrangement of the mirrors of the scanning appliance which when assembled form a helix that can be rotated in either direction for scanning purposes.

Features of invention are shown in the construction, combination and arrangement of parts whereby a rotary apparatus is provided that is easy to construct, assemble and operate, and which is also effective in operation and durable in use.

Another object of the invention is to provide a rotary apparatus that can be operated to scan a field either with a steady beam of light or with an interrupted beam of light.

Other objects may appear from the accompanying drawing, the subjoined detailed description and the appended claims.

The accompanying drawings illustrate the invention.

Fig. 1 is a semi-diagrammatic view of the rotary apparatus in use.

Fig. 2 is an enlarged end view of the rotary apparatus detached from the motor, showing its helix formed of a plurality of rectangular units.

Fig. 3 is a front view of the rotary apparatus.

Fig. 4 is a cross section on line 4—4, Fig. 3, showing a single unit of the helix.

Fig. 5 is an edge view of one of the sheet metal units detached from the shaft showing its elongated straight mirror edge.

Fig. 6 is a grouped side and edge view of a modified form of units having convexed edges.

Fig. 7 is a view analogous to Fig. 6, showing a unit with concave edges.

Fig. 8 is another grouped side and edge view of another form of unit showing saw teeth on its mirror edge.

Fig. 9 is still another form of unit showing the mirror edge made up of concavo-convexed surfaces.

Fig. 10 is another cross section through the helix on line 10—10, Fig. 3.

The reflecting and scanning apparatus includes a lamp 15 and lens 16 for directing the light onto the helical mirror 17 from where it is reflected to and over the field 18 by rotation of the mirror; and from the field the rotator, if visualized, would appear to be a stationary rectangular mirror in which the image reflected by the lamp would be clearly visible while in reality the image would be reflected point by point in vertical lines that progress from side to side of the field, also from end to end of each unit of the rotary apparatus.

The helical mirror can be rotated in any desired manner. For the purpose of illustration it is shown provided with a shaft 19 that is rotated by the motor 20 that can be driven in a well known way.

The helical mirror 17 is made up of a plurality of units 21 that are preferably rectangular, as shown in Figs. 1 to 5, inclusive, but can be of different forms as illustrated in Figs. 6 to 9 inclusive.

The units 21 are arranged on the shaft 19 and secured between the opposing nuts 22, 23 so that when properly assembled they are held in a relatively fixed position on the shaft, and the arrangement is such that they form a helix of a single turn.

Each unit is provided with a mirror edge 24, preferably treated to form a single surface mirror and has its other edge 25 and ends 26, 27 blackened or treated so that they are not reflectors of light so that only the mirror edges 24 reflect the light from the lamp 15 to the field 18; and the units are arranged so that they form a composite helical mirror which, when rotated, reflect beams of light in a consecutive order to scan the field 18. In other words each unit is mounted and secured on the shaft so its mirror edge is close to and arranged tangentially to the longitudinal axis of the shaft and also arranged in stepped relationship to one another so they form a helix which when rotated causes a ray of light from a lamp to move over each mirror edge from end to end and progressively from end to end of the helix.

As previously indicated the helical mirror can be rotated in either direction, as indicated by the arrows in Fig. 2.

When the scanning appliance is operated with the helical mirror moving in the direction of the arrow —a—, the vertical lines 30 indicated by dotted lines in the field 18 will begin at the top of the field and extend downward and the other direction of movement will be from the right to the left of the field; and when the mirror is reversely rotated, as in the direction of the arrow —b—, the vertical lines will begin at the bottom of the field and extend upwardly and the other movement will be from the left to the right of the field, and in this movement the reflected light will move from end to end of each mirror edge and from end to end of the helix as stated.

It is also understood that the helical mirror can be arranged in any desired position and can have a multiplicity of mirror surfaces.

When the helical mirror is made up of units such as are shown in Figs. 6 to 9, inclusive, it is operated in substantially the same way as indicated in Figs. 1 to 5 inclusive.

If desired the helical mirror 17 can be made up of units 21 of the form shown in Figs. 8 and 9, in which instance only a part of the edge 24 of each unit is a mirror.

As previously indicated this rotary apparatus is adapted for use in telephoto, radiophoto and telegraphing, as well as in television.

In operation the lamp 15, lens 16, helical mirror 17 and field 18 are properly arranged as indicated in Fig. 1. Then the mirror is rotated as described to reflect the light beam from the lamp 15 to the field 18, which is completely scanned in two directions at each revolution of the mirror.

I claim as my invention:

1. A reflecting and scanning apparatus including a plurality of rectangular units arranged side by side and secured together so as to form a helix, a reflector edge to each of said units, means for preventing the other edges and ends of said units from reflecting light, and other means for rotating said units for the purpose specified.

2. A reflecting and scanning apparatus including a shaft, a plurality of rectangular units arranged side by side on said shaft and secured together so as to form a helix, a reflector edge to each of said units arranged angularly one to the other in a predetermined order, means for preventing the other edges and ends of said units from reflecting light, and other means for rotating said shaft for the purpose specified.

3. A reflecting and scanning apparatus including a shaft, a plurality of rectangular sheet metal plates arranged side by side and centrally on said shaft, opposing nuts on said shaft for pinching said plates together so as to hold them in a fixed position on said shaft, a mirror edge to each plate, means for preventing the other edges and ends of said plates from reflecting light, and other means for rotating said shaft for the purpose specified.

4. A reflecting and scanning apparatus including a shaft, a plurality of rectangular sheet metal plates arranged side by side each having a hole extending centrally therethrough whereby said plates can be mounted on said shaft, opposing nuts for pinching said plates together so as to hold them in a fixed prearranged position on said shaft, a straight reflector edge to each plate arranged tangentially and near to the longitudinal axis of said shaft, means for preventing the other edges and ends of said plates from reflecting light, and other means for rotating said shaft.

5. A reflecting and scanning apparatus including a shaft, a plurality of elongated rectangular sheet metal plates having holes extending centrally therethrough, whereby they can be mounted on said shaft side by side, opposing nuts for pinchingly engaging said plates so as to hold them in a prearranged position on said shaft, a straight mirror edge to each of said plates arranged angularly to one another and tangentially and near to the longitudinal axis of said shaft so that light from a large arc can be reflected from each mirror edge, means for preventing the other edges and ends of said plates from reflecting light, and other means for rotating said shaft.

6. A reflecting and scanning appliance for use in television including a shaft, a plurality of sheet metal plates each having a plurality of mirror surfaces on an edge thereof with spaces between the mirror surfaces blackened and the other edge and ends treated to prevent their reflecting light, said plates arranged so as to form a composite helical mirror and so that each plate carries a plurality of mirror surfaces arranged in the same plane, and means for rotating said shaft.

7. A reflecting and scanning appliance for use in television including a shaft, a plurality of sheet metal plates secured on said shaft each having a mirror on a concave edge thereof with the other edge and ends blackened to prevent their reflecting light, said plates arranged so as to form a composite helical mirror, and means for rotating said shaft.

In witness whereof, I have hereunto affixed my signature.

DELAMERE B. GARDNER.